March 4, 1958 A. W. McDONALD 2,825,582
FOLDABLE STEPS FOR TRAILER
Filed June 25, 1953 2 Sheets-Sheet 1
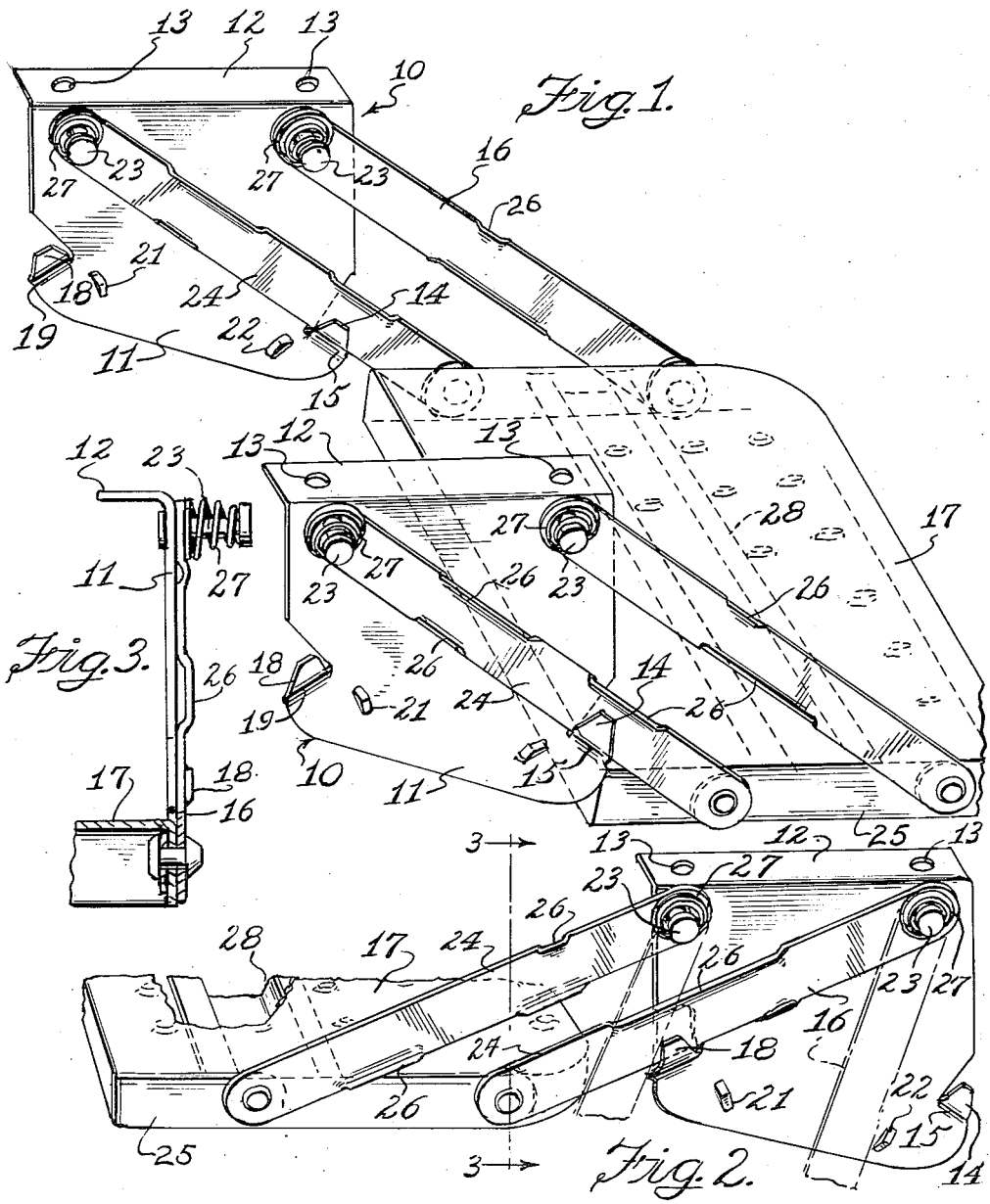
INVENTOR.
Albert W. McDonald
BY Nathan N. Kraus and
Frank H. Marbs
Attorneys March 4, 1958  A. W. McDONALD  2,825,582
FOLDABLE STEPS FOR TRAILER
Filed June 25, 1953  2 Sheets-Sheet 2
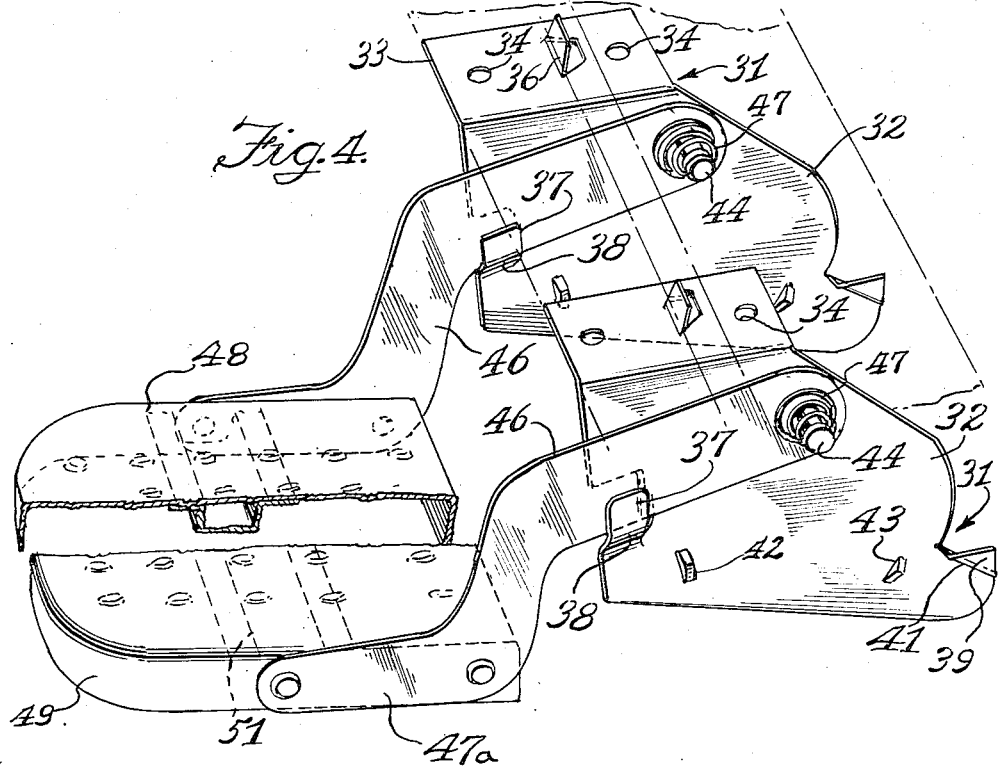
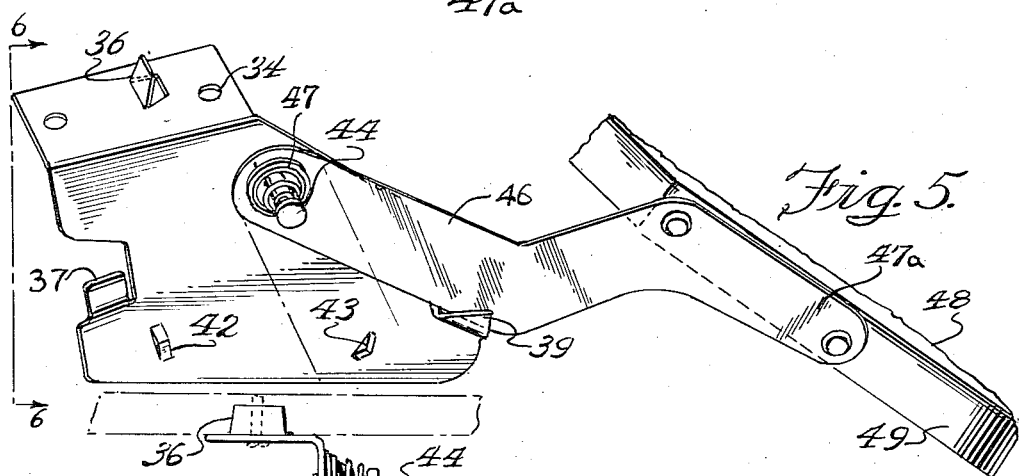
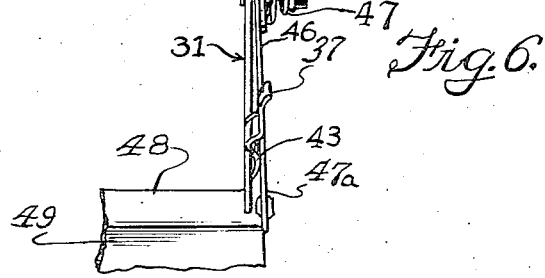
INVENTOR.
Albert W. McDonald
BY Nathan N. Kraus and
Frank H. Marks
Attorneys

United States Patent Office 2,825,582
Patented Mar. 4, 1958

2,825,582

FOLDABLE STEPS FOR TRAILER

Albert W. McDonald, St. Petersburg, Fla.

Application June 25, 1953, Serial No. 364,005

4 Claims. (Cl. 280—166)

My invention relates to a novel foldable step particularly adapted for use on automobile trailer vehicles but of course suitable for other applications wherever the features of such a step may be desirable.

One of the objects of my invention is the provision of a trailer step which may be quickly and easily positioned for use and collapsed and folded under the trailer when not in use.

Another object of my invention is the provision of a trailer step which is adequately secured in in-use or out-of-use positions against inadvertent displacement.

Another object of my invention is the provision of a trailer step which is sturdy, durable and efficient in service and economical to manufacture.

A further object of my invention is the provision of a trailer step utilizing identical supporting brackets whereby a minimum of tooling is required in the fabrication thereof.

Other and further objects and advantages of my invention will become apparent from the following description when considered in connection with the accompanying drawings, in which:

Fig. 1 is a perspective view of a foldable step in accordance with my invention.

Fig. 2 is a fragmentary perspective view showing the step in out-of-use position.

Fig. 3 is a cross-sectional view on an enlarged scale taken substantially on line 3—3 of Fig. 2.

Fig. 4 is a perspective view of a modified embodiment of my invention.

Fig. 5 is a fragmentary perspective view showing the step in out-of-use position.

Fig. 6 is an end elevational view looking in the direction of arrows 6—6 of Fig. 5.

Referring particularly to Figs. 1 to 3 my invention comprises a pair of identical brackets shaped substantially as illustrated in Fig. 1, the said brackets being formed preferably of stamped sheet metal to include a body portion 11 provided with a flange 12 along the top edge thereof which flange is perforated as at 13 to receive bolts or screws by which the bracket may be attached to the underside of a trailer. Struck out from the body portion 11 of each of the brackets along the forward edge is an integral lug 14 which is offset but substantially parallel to the plane of the body portion 11. The portion 15 connecting the lug 14 to the body portion 11 is inclined downwardly as illustrated in Fig. 1 and provides a shoulder or abutment for supporting a link arm such as 24 supporting the tread 17 as will be hereinafter explained. As will be apparent, the lug 14 cooperates with the body portion to provide in effect a socket for receiving and retaining the arm 24 therein against lateral displacement. A similar lug 18 is struck out of the rearward edge of the body portion 11 and the connecting portion 19 thereof is inclined oppositely from that first mentioned. Struck out from the body portion 11 substantially in the positions illustrated in Fig. 1 are a pair of embossings or camming surfaces 21 and 22 for a purpose which will be hereinafter described.

Each bracket 10 is provided near its upper edge with two spaced perforations, each to receive a stud 23 which pivotally supports a link arm. Forward and rearward arms 16 and 24, respectively, are provided, each connected at their distal ends to a metal tread 17 provided with downturned flanges 25, the arms being pivotally connected to the flanges of said tread. It will be apparent that I have provided a parallelogram arrangement in which the tread 17 is maintained at all times in horizontal position. A coiled compression spring 27 is carried on each of the studs 23 and serves to urge each of the arms 16 and 24 in contiguous relation to the body portion of the bracket so that the said arms are normally caused to enter the spaces defined by the lugs and the bracket body. A U-shaped channel iron 28 provided with outturned flanges is welded to the underside of the tread as shown more clearly in Fig. 2 and affords reinforcement to the tread for rigidifying the same.

The parallel arms 16 and 24 may be formed of stamped sheet metal and may be provided along their forward and rearward edges with upturned portions such as 26 for the purpose of facilitating movement of the arms over the lugs when the arms are moved from one position to another.

In operative or in-use position, the parts are in the relation illustrated in Fig. 1, with the rearward arms 24 each received in a space between a lug 14 and body portion 11 and supported on portion 15. The said arms are thus securely cradled against inadvertent dislodgement and the tread 17 is rigidly supported. In order to swing the tread 17 from in-use to out-of-use position, the tread is elevated sufficiently so that the rearward arms 24 clear the upper edges of the lugs 14 and then with a slight lateral movement of the tread the arms 24 are freed of the lugs and may be swung rearwardly to the position illustrated in Fig. 2. In such movement the upturned edges 26 of the arms and also the embossings 21 on the body portions cooperate to facilitate movement of both arms 16 and 24 over the rearward lugs 18 so that snagging is avoided. When the forward arms 16 clear the top edges of the rearward lugs 18 the springs 27 serve to urge the said arms in contiguous relation to the body portions 11 and the weight of the tread 17 itself will cause the forward arms 16 to enter into the space between the lugs 18 and the body portions of the brackets and to engage the portions 19 of the lugs thereby effectively cradling the arms 24 against inadvertent dislodgement. It will be apparent that in order to move the tread 17 from out-of-use to in-use position, the tread must be elevated sufficiently so that the forward arms 16 are caused to clear the upper edges of the rearward lugs 18 and similarly as hereinbefore explained when the arms are swung to in-use position the upturned edges 26 and embossings 22 cooperate to facilitate movement of the arms 16 and 24 over the forward lugs.

It will be apparent that in the embodiment hereinabove described the tread 17 is maintained upright and in horizontal position in both in-use and out-of-use positions and also in any intermediate position of movement.

Referring to the modified embodiment illustrated in Figs. 4 to 6, my invention comprises a pair of identical brackets 31 preferably formed from sheet metal and shaped substantially as illustrated in Fig. 4. The said brackets each include a vertical body portion 32, provided with a flange 33 along the upper edge, the said flanges being perforated as at 34 to receive fastening means by which the brackets may be securely attached to the underside of a trailer. A tab 36 may be struck out from the flange 33 to facilitate locating of the brackets in proper position under the trailer. A lug 37 is struck out of the body portion 32 along the forward edge and is off-set from the plane of said body portion, the connecting portion 38 of the lug being inclined in angular relation to a horizontal line. At the rearward edge of the body portion a similar type of lug 39 is struck out and the connecting portion 41 thereof is inclined oppositely from portion 38. A pair of embossings or camming surfaces 42 and 43 are formed in the body portion of the bracket and are disposed in relatively close proximity to corresponding lugs. The said embossings serve as camming portions to facilitate movement of the arms, presently to be described, over the lugs. Each of the brackets is provided with a perforation to receive a stud 44 from which is pivotally supported a tread supporting arm 46. Each stud is provided with a compression spring 47 which serves to urge a corresponding arm in contiguous relation to the body portion of the bracket.

The supporting arms 46 are identical in construction and are shaped substantially as illustrated in Fig. 4. The said arms are substantially dog-legged members each having an extension 47a at one end which is riveted to a tread 48 supported between the said arms. The tread is provided with downturned flanges 49 and a U-shaped channel iron 51 having outturned flanges is welded to the underside of the tread to afford reinforcement for the same.

In in-use position the parts are in the relation illustrated in Fig. 4 with the arms 46 received in the spaces between the lugs 37 and the body portions 32 of the brackets and securely cradled therein against inadvertent dislodgement. In order to position the tread 48 to out-of-use position the tread is caused to be moved upwardly so that the arms 46 are clear of the lugs. The tread is then shifted laterally so that the arms 46 are completely disengaged from the lugs 37 and the tread and arms may then be swung to the position illustrated in Fig. 5. It will be noted that similarly as in the first embodiment the leading edges of the arms 46 are caused to engage the embossings 43 which afford a camming action to space the arms from the body portions and guide them over the rearward lugs 39 so as to prevent snagging. In the out-of-use position, as illustrated in Fig. 5, the tread 48 and arms 46 are similarly cradled against inadvertent dislodgement.

It will be understood that the arms 46 may be provided with upturned edge portions similar to the portions 26 of the embodiment illustrated in Figs. 1–3.

It will be apparent that in each of the embodiments hereinbefore described the brackets are identical in construction and are identically positioned so that in the fabrication of said brackets only one set of tools is required.

Various changes coming within the spirit of my invention may suggest themselves to others skilled in the art. Hence, I do not wish to be limited to the specific embodiments shown and described or uses mentioned, but intend the same to be merely exemplary, the scope of my invention being limited only by the appended claims.

I claim:

1. A foldable step for vehicles comprising a pair of spaced brackets adapted to be secured to the underside of the body of a vehicle, a pair of parallel arms pivotally connected to each bracket adjacent corresponding sides of said brackets, a step constituting a tread pivotally secured to said arms, spring means coaxial with the pivotal connections of said arms for urging said arms contiguous to corresponding sides of respective brackets, and forward and rearward offset abutments struck out from the plane of corresponding sides substantially at respective edges of said brackets, said forward abutments constituting cradles arranged to receive one of each pair of arms to support said tread in operative position, and said rearward abutments being arranged to receive the other arm of each pair of arms to support said tread in inoperative position, and a camming portion embossed on corresponding sides of each of said brackets in close proximity to each abutment, each camming portion being arranged to cam an arm laterally from a respective bracket side when said arm in its pivotal movement approaches said abutment so as to guide said arm over said abutment.

2. A foldable step for vehicles comprising a pair of spaced brackets adapted to be secured to the underside of the body of a vehicle, a stud supported on each bracket, an arm pivotally supported on each of said studs adjacent corresponding sides of said brackets, spring means coaxial with said studs for urging respective arms contiguous to respective adjacent sides of said brackets, a step comprising a tread secured to said arms, an offset abutment struck out from the plane of corresponding sides of each of said brackets and disposed forwardly of the pivotal axis of respective arms, each of said abutments constituting a cradle arranged to receive and support an arm to secure said tread in operative position, and a camming portion embossed on corresponding sides of each of said brackets in close proximity to each abutment, each camming portion being arranged to cam an arm laterally from a respective bracket side when said arm in its pivotal movement approaches said abutment so as to guide said arm over said abutment.

3. A foldable step for vehicles comprising a pair of spaced brackets adapted to be secured to the underside of the body of a vehicle, a pair of supporting arms each pivotally connected to a bracket and being disposed contiguous to corresponding sides of said brackets, a step comprising a tread secured to said arms, forward and rearward offset abutments struck out from the planes of said corresponding sides of each of said brackets below the points of pivotal connection of said arms to said brackets, said forward abutments constituting cradles arranged to receive and support respective arms so that said tread is maintained in operative position, said rearward abutments being arranged to support respective arms whereby said tread is maintained in inoperative position, a camming portion embossed on each of said corresponding sides of each of said brackets in close proximity to each abutment, said camming portions being arranged to cam both of said arms laterally in the same direction from respective bracket sides when said arms in their pivotal movement approach said abutments so as to guide said arms over said abutments.

4. A foldable step for vehicles comprising a pair of spaced brackets adapted to be secured to the underside of the body of a vehicle, a pair of parallel arms pivotally connected to each bracket, each pair of said arms being disposed contiguous to one of the corresponding sides of said brackets, a step constituting a tread pivotally secured to said arms, forward and rearward offset abutments struck out from the planes of said corresponding sides of each of said brackets below the points of pivotal connection of said arms to said brackets, said forward abutments constituting cradles arranged to receive one of each pair of arms to support said tread in operative position and said rear abutments being arranged to receive the other arm of each pair of arms to support said tread in inoperative position, and a camming portion embossed on each of the corresponding sides of said brackets in close proximity to each abutment, said camming portions being arranged to cam said arms laterally in the same direction from respective bracket sides when said arms in their pivotal movement approach said abutments so as to guide said arms over said abutments.

References Cited in the file of this patent

UNITED STATES PATENTS

| | | |
|---|---|---|
| 1,606,099 | Rudolph | Nov. 9, 1926 |
| 2,436,961 | Gabriel | Mar. 2, 1948 |
| 2,653,036 | Creel et al. | Sept. 22, 1953 |
| 2,670,968 | Duffy | Mar. 2, 1954 |